United States Patent
Mirza et al.

(10) Patent No.: US 12,150,048 B2
(45) Date of Patent: Nov. 19, 2024

(54) PROXY-CALL SESSION CONTROL FUNCTION (P-CSCF) SELECTION BY TRAFFIC TYPE

(71) Applicant: T-Mobile USA, Inc., Bellevue, WA (US)

(72) Inventors: Khurram Ahmad Mirza, Bellevue, WA (US); Aziz Motiwala, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 37 days.

(21) Appl. No.: 17/543,621

(22) Filed: Dec. 6, 2021

(65) Prior Publication Data
US 2023/0180122 A1    Jun. 8, 2023

(51) Int. Cl.
*H04W 48/20*    (2009.01)
*H04L 65/1045*    (2022.01)
*H04W 4/12*    (2009.01)

(52) U.S. Cl.
CPC ......... *H04W 48/20* (2013.01); *H04L 65/1045* (2022.05); *H04W 4/12* (2013.01)

(58) Field of Classification Search
CPC .................................................... H04L 67/56
USPC .............................. 455/404.2; 370/259, 225
See application file for complete search history.

(56) References Cited

U.S. PATENT DOCUMENTS

| | | | |
|---|---|---|---|
| 2010/0303031 A1* | 12/2010 | Rune | H04W 12/088 370/329 |
| 2019/0028992 A1* | 1/2019 | Kim | H04W 8/06 |
| 2020/0305211 A1* | 9/2020 | Foti | H04L 65/1073 |
| 2022/0131911 A1* | 4/2022 | Das | H04L 65/1016 |
| 2022/0311746 A1* | 9/2022 | Boucadair | H04L 63/0884 |
| 2022/0386166 A1* | 12/2022 | Sarker | H04W 28/0273 |
| 2023/0113082 A1* | 4/2023 | Sabeur | H04L 65/1104 455/435.1 |

* cited by examiner

*Primary Examiner* — Kiet M Doan
(74) *Attorney, Agent, or Firm* — Foley IP Law, PLLC

(57) ABSTRACT

Solutions for providing proxy node (e.g., proxy-call session control function (P-CSCF)) selection by traffic type include: receiving, by a network node (e.g., a packet gateway (PGW)), from a network device (e.g., a user equipment (UE) or internet of things (IoT) device), a first message indicating a request for identification of a proxy node; receiving, by the network node, from the network device, an indication of a first data traffic type; based on at least the indication of the first data traffic type, selecting, by the network node, a first proxy node over a second proxy node to identify to the network device; and transmitting an identification of the first proxy node to the network device. Examples support network slicing and improve wireless priority service (WPS) and enhanced 911 (SECOND DATA TRAFFICE911).

16 Claims, 5 Drawing Sheets

PROXY-CALL SESSION CONTROL FUNCTION (P-CSCF) SELECTION BY TRAFFIC TYPE

BACKGROUND

In order to make a voice call, video call, or even engage in some other types of data sessions, a cellular network device (e.g., a user equipment (UE) or internet of things (IoT) device) uses a proxy node, such as a proxy-call session control function (P-CSCF). The network device obtains a list of proxy nodes (typically three), selects one from the list, and attempts to connect with the selected proxy node. However, the set of proxy nodes on the received list may not be the best available set for the network device, when viewed from the perspective of cellular network resource optimization.

SUMMARY

The following summary is provided to illustrate examples disclosed herein, but is not meant to limit all examples to any particular configuration or sequence of operations.

Solutions for providing proxy node (e.g., proxy-call session control function (P-CSCF)) selection by traffic type include: receiving, by a network node (e.g., a packet gateway (PGW)), from a network device (e.g., a user equipment (UE) or internet of things (IoT) device), a first message indicating a request for identification of a proxy node; receiving, by the network node, from the network device, an indication of a first data traffic type; based on at least the indication of the first data traffic type, selecting, by the network node, a first proxy node over a second proxy node to identify to the network device; and transmitting an identification of the first proxy node to the network device. Examples support network slicing and improve wireless priority service (WPS) and enhanced 911 (E911).

BRIEF DESCRIPTION OF THE DRAWINGS

The disclosed examples are described below with reference to the accompanying drawing figures listed below, wherein.

Figure 1:
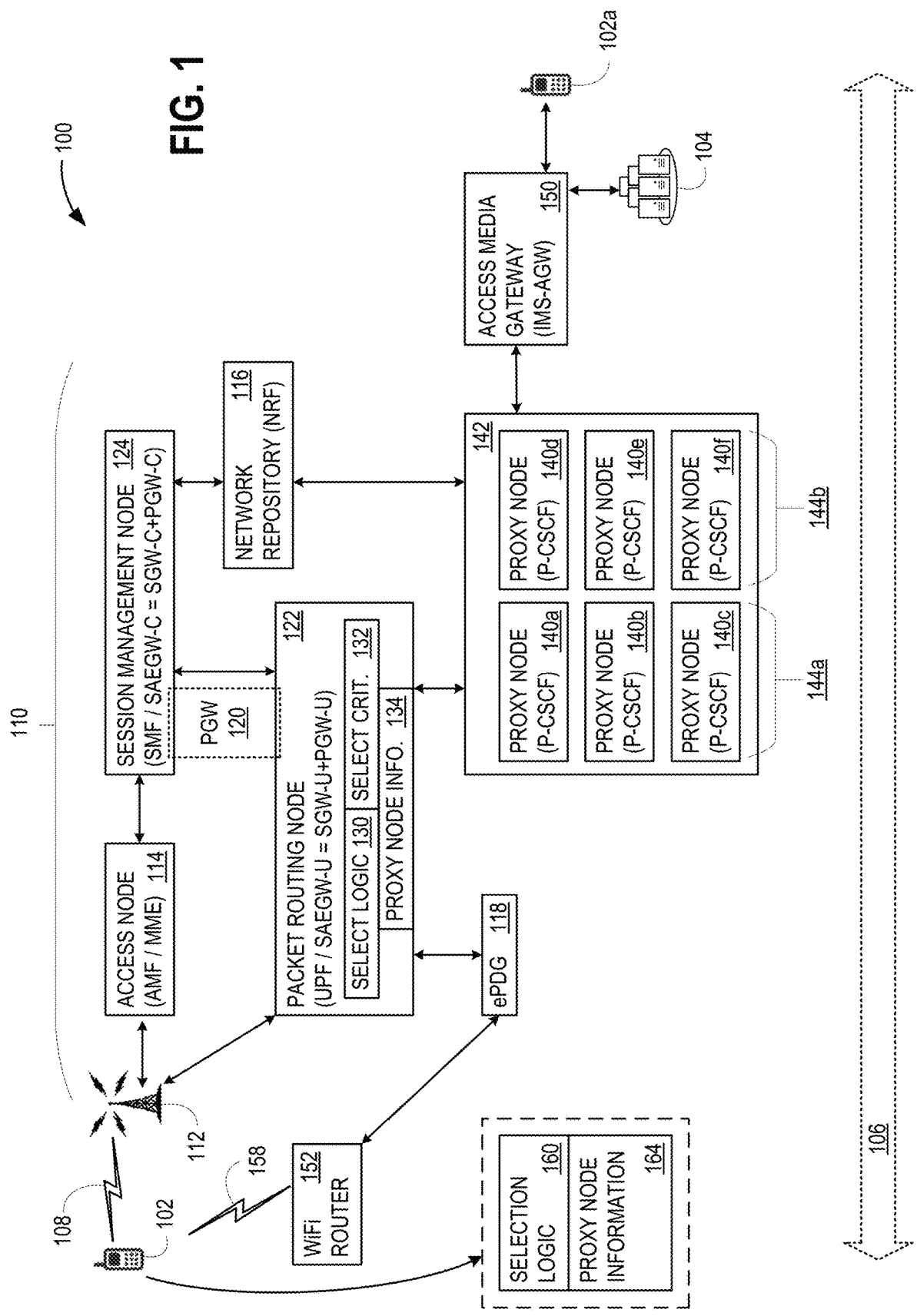
FIG. 1 illustrates an exemplary arrangement that advantageously performs proxy-call session control function (P-CSCF) selection by traffic type.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for providing proxy node (e.g., proxy-call session control function (P-CSCF)) selection by traffic type include: receiving, by a network node (e.g., a packet gateway (PGW)), from a network device (e.g., a user equipment (UE) or internet of things (IoT) device), a first message indicating a request for identification of a proxy node; receiving, by the network node, from the network device, an indication of a first data traffic type; based on at least the indication of the first data traffic type, selecting, by the network node, a first proxy node over a second proxy node to identify to the network device; and transmitting an identification of the first proxy node to the network device. Examples support network slicing and improve wireless priority service (WPS) and enhanced 911 (E911).

Aspects of the disclosure the performance and efficiency of cellular network operations by providing a more optimal set of proxy nodes to network devices (e.g., a UE or an IoT device) than is provided by traditional load balancing selection techniques (e.g., round-robin assignment). For example, aspects of the disclosure teach, based on at least an indication of a traffic type, selecting, by a network node, a first proxy node over a second proxy node to identify to the network device. With such a scheme, network slicing is able to route fifth generation cellular technology (5G) through one set of P-CSCFs and fourth generation cellular technology (4G) through a different set of P-CSCFs, and concentrate gaming traffic, IoT traffic, in-vehicle (e.g., in-flight) wireless traffic, circuit-switched (CS) traffic, managed WiFi traffic, and other traffic types in specific sets of P-CSCFs.

Such isolation by traffic type may provide reliability enhancements and permit configuration economization, as all P-CSCFs are no longer required to support all traffic types. Additionally, geographic considerations in P-CSCF selection my reduce latency for wireless priority service (WPS) and enhanced 911 (E911) calls, improving performance for critical communications.

FIG. 1 illustrates an exemplary arrangement 100 that advantageously performs proxy node selection by traffic type. In arrangement 100, a network device 102 will attempt to establish a data traffic session 106 with a second network device 102a or a remote resource 104 (e.g., a computer network server). Network device 102 may be a UE, an IoT device, a device not having a subscriber identity module (SIM) (e.g., a SIM-less device), or another device capable of using a cellular network 110 for communication. Data traffic session 106 may be 5G, 4G, another cellular technology generation, a voice call, a video call, a managed WiFi call, a WPS call, an E911 call, CS traffic, roaming traffic, a rich communication services (RCS) session (e.g., 1-to-1 chat or 1-to-many chat), other instant messaging, streaming video, IoT traffic (e.g., machine-to-machine (M2M) communication, IoT vertical), SIM-less device traffic, in-vehicle (in-flight) wireless traffic, gaming services, or other types of traffic that may be carried for cellular network 110.

Network device 102 may reach cellular network 110 using an air interface 108 to a radio access network (RAN) 112. RAN 112 routes signaling traffic to a control plane, which includes an access node 114, and a session management node 124. In some examples, access node 114 comprises an access and mobility function (AMF) or a mobile management entity. In some examples, session management node 124 comprises a session management function (SMF) or a system architecture evolution gateway (SAEGW)-control plane (SAEGW-C). An SAEGW-C is the control plane side of the combination of a serving gateway (SGW) and a packet gateway (PGW). A PGW may also be referred to as a packet data network gateway (PDN gateway, or simply PGW). In some examples, session management node 124 discovers resources of cellular network using a network resource function (NRF) 116.

RAN 112 routes data traffic to a user plane, which includes a packet routing node 122 and a set of proxy nodes 142. Based on its source/destination, at least a portion of the data traffic then passes through an interne protocol (IP) multimedia subsystem (IMS) access media gateway (IMS-AGW) 150 to reach second network device 102*a* or remote resource 104. In some examples, packet routing node 122 comprises a user plane function (UPF) or an SAEGW-user plane (SAEGW-C). An SAEGW-U is the user plane side of the combination of an SGW and a PGW. A network node 120 represents gateway functionality (e.g., PGW functionality) that may reside in packet routing node 122 and/or session management node 124. That is, functions described herein as being performed by network node 120 may be performed by packet routing node 122, by session management node 124, or by a combination of both packet routing node 122 and session management node 124 (or in some cases, in conjunction with another node of cellular network 110).

For managed WiFi data traffic (e.g., WiFi calling through cellular network 110), network device 102 reaches cellular network 110 using an air interface 158 to a WiFi router 152 that communicates with an evolved packet data gateway (ePDG) 118. ePDG 118 routes data traffic to/from packet routing node 122. Although six proxy nodes 140*a*-140*f*, and only a single one of each of RAN 112, access node 114, session management node 124, NRF 116, packet routing node 122, and ePDG 118 are illustrated, it should be understood that a different number of any of these nodes may be used within cellular network 110.

In order to maximize efficiency and/or performance, operators of cellular network 110 wish to implement network slicing. To support this, different traffic types are to be steered to specific ones of proxy nodes 140*a*-140*f* in set of proxy nodes 142 comprise P-CSCFs. In some examples, one or more of proxy nodes 140*a*-140*f* comprise P-CSCFs.

As illustrated, packet routing node 122 has proxy node selection logic 130, (proxy node) selection criteria 132, and proxy node information 134, although these components may be located anywhere in the more generally-referenced network node 120. Proxy node selection logic 130 selects one or more of includes proxy nodes 140*a*-140*f*, from among proxy nodes listed in proxy node information 134, to identify to network device 102, based on a traffic type indicated in a proxy node discovery message (see FIG. 2) sent by network device 102 to network node 120. In some examples, network node 120 receives at least some of proxy node information 134 from NRF 116. In some examples, network node 120 retrieves at least some of proxy node information 134 from a domain name system (DNS). In some examples, network node 120 compiles (or appends) proxy node information 134 with information received directly from one or more of proxy nodes 140*a*-140*f*.

Network device 102 has its own proxy node selection logic 160, which is used to register with a selected proxy node found in proxy node information 164 received from network node 120. Proxy node selection logic 160 is also used during fail-over, such as when be selected proxy node does not respond, network device 102 selects another proxy node to use. Further description of FIG. 1 will be made with additional reference to FIGS. 2 and 3.

Figure 2:
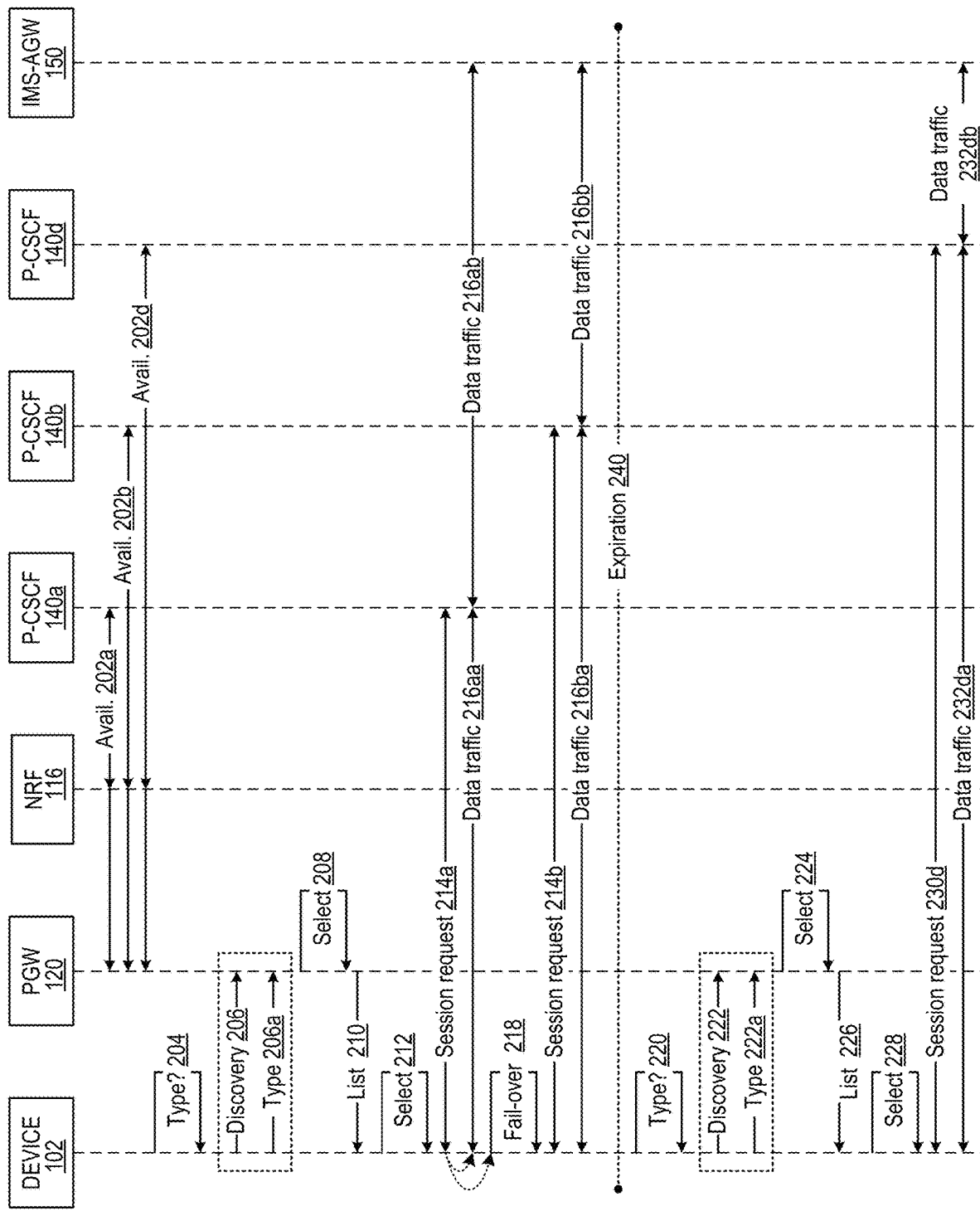
FIG. 2 illustrates an example message sequence diagram of messages that may be used with examples of the arrangement of FIG. 1.
Figure 3:
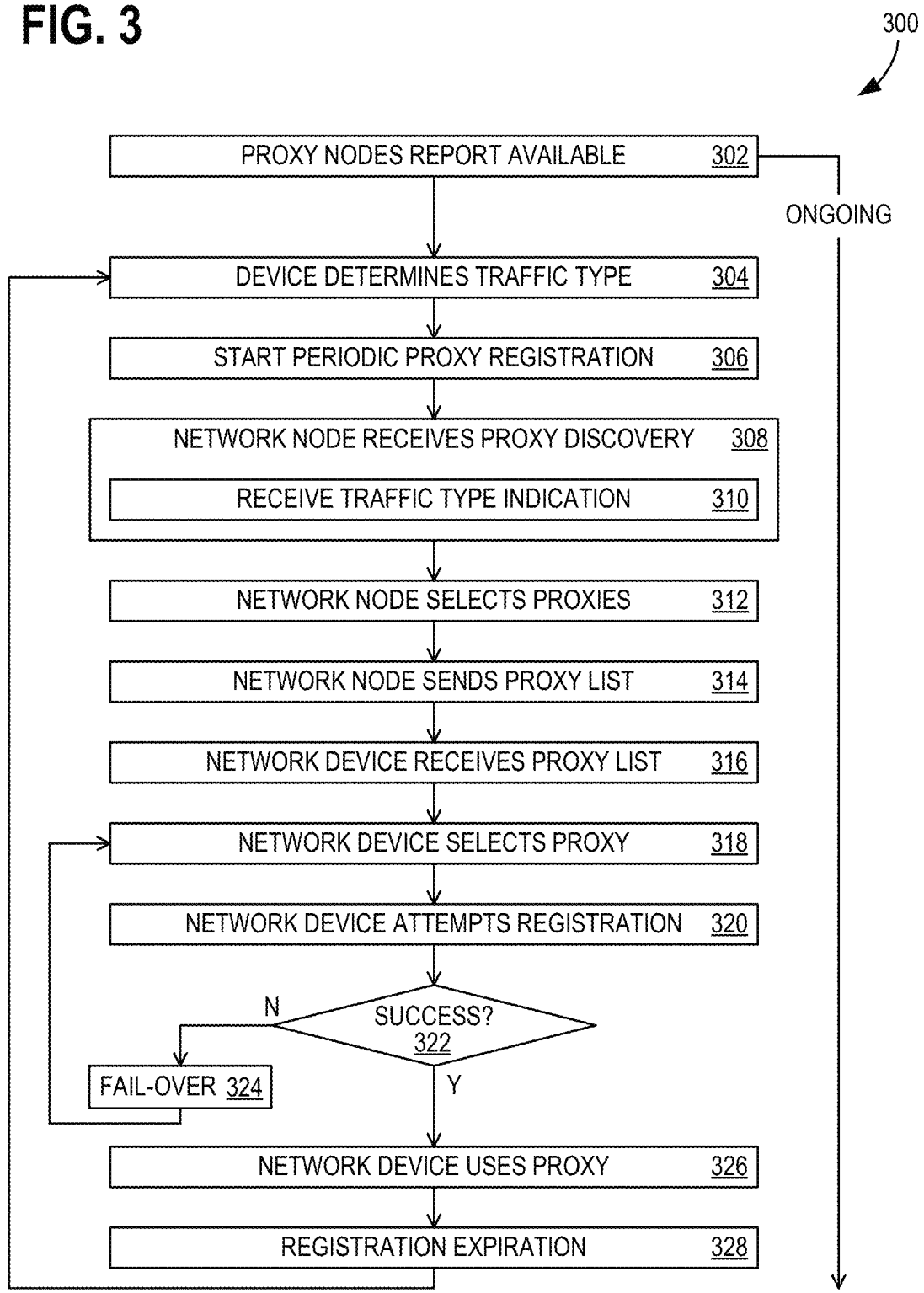
FIG. 3 illustrates a flowchart of exemplary operations associated with examples of the arrangement of FIG. 1.

FIG. 2 illustrates an example message sequence diagram 200 of messages that may be used with examples of arrangement 100, and FIG. 3 illustrates a flowchart 300 of exemplary operations associated with examples of arrangement 100 performing proxy node selection by traffic type. FIGS. 2 and 3 will be described together, with continued reference to FIG. 1. In some examples, at least a portion of flowchart 300 may each be performed using one or more computing devices 500 of FIG. 5. Flowchart 300 commences with operation 302 in which proxy nodes 140*a*-140*f* advertise their availability, status, and/or capabilities. Such advertisements are indicated in FIG. 2 as message 202*a* from proxy node 140*a*, message 202*b* from proxy node 140*b*, and message 202*d* from proxy node 140*d*. To avoid crowding FIG. 2, only three proxy nodes and messages are shown, although proxy node 140*c*, proxy node 140*e*, and proxy node 140*f* also advertise their status using equivalent messages.

Messages 202*a*, 202*b*, and 202*c* may go to network node 120 and/or NRF 116, and be repeated in an ongoing manner (e.g., on a schedule, such as every 15 minutes). Messages 202*a*, 202*b*, and 202*c* provide proxy node information 134, such as latency information, geographic information, and proxy node capability used for network slicing (e.g., a particular capability to handle certain types of traffic). In some examples, network node 120 may pull at least a portion of proxy node information 134 from one or more sources. Operation 302 thus includes pushing, by proxy node 140*a* (a first proxy node) and proxy node 140*d* (a second proxy node) status updates to network node 120. Operation 302 also includes receiving, by network node 120, the status updates for proxy node 140*a* and proxy node 140*d*. In some examples, NRF 116 is an intermediate destination for the messages. In some examples, the proxy nodes provide the information directly to network node 120.

A first pass through flowchart 300 will be described in relation to network device 102 registering with proxy node 140*a* for a first data traffic type, and then a second pass through flowchart 300 will be described in relation to network device 102 registering with proxy node 140*b* for a second (different) traffic type. Network device 102 determines the data traffic type for which it will be using a proxy node in operation 304 (also shown as decision 204 in FIG. 2), and which will be identified in proxy node discovery request 206 as data traffic type 206*a*. Because a registration of network device 102 with a proxy node is time limited (e.g., for one hour), network device 102 starts periodic proxy node registration. Operation 306 includes transmitting, by network device 102, to network node 120, a first message (proxy node discovery request 206) indicating a request for identification of a proxy node. In some examples, the indication of data traffic type 206*a* is within the first message indicating the request for identification of a proxy node.

Operation 308 includes receiving, by network node 120, from network device 102, the first message (proxy node discovery request 206) indicating a request for identification of a proxy node. In some examples, network node 120 comprises at least one node selected from the list consisting of: a PGW, a UPF, an SMF, an SAEGW-C, an SAEGW-U, and a PDN Gateway. Operation 310 includes receiving, by network node 120, from network device 102, an indication of data traffic type 206*a*. In some examples, data traffic type 206*a* comprises at least one data traffic type selected from the list consisting of: 5G cellular data, 4G cellular data, voice call, video call, WPS, E911, short message service (SMS), RCS, instant messaging, managed WiFi, in-vehicle wireless, IoT, M2M communication, IoT vertical, SIM-less, CS, roaming, gaming, and streaming video. In some examples, when operation 310 is included in operation 308, the indication of data traffic type 206*a* is within the first message indicating the request for identification of a proxy node.

As part of the network slicing plan for cellular network 110, proxy nodes 140a-140c are preferred for data traffic type 206a, whereas proxy nodes 140d-140f are preferred for data traffic type 222a. In some examples, proxy nodes 140a-120c may be configured or tailored differently than proxy nodes 140a-120c. Thus, operation 312 (also shown as selection 208 in FIG. 2) includes, based on at least the indication of data traffic type 206a, selecting, by network node 120, proxy node 140a over proxy node 140d (and also proxy nodes 140e and 140f) to identify to network device 102. In some examples, selecting proxy node 140a comprises selecting proxy node 140a based on at least selection criteria 132. In some examples, selection criteria 132 comprises at least one factor selected from the list consisting of: a geographical location, latency, loading, and network slicing. In some examples, selecting proxy node 140a comprises selecting proxy node 140a based on at least determining that proxy node 140a is preferred to handle data traffic type 206a.

At least a portion of operation 312 is performed by proxy node selection logic 130 applying selection criteria 132 to proxy node information 134. Using a P-CSCF closest to a gateway may minimize latency for WPS and E911 calls, which is one way to use geographic information. Additional parameters may also be considered, such as P-CSCF loading and latency statistics, and location-based service (LBS) driven selections. Operation 314 transmits the identification of proxy node 140a to network device 102 as list 210. In some examples, transmitting the identification of proxy node 140a to network device 102 comprises transmitting identification of a plurality of proxy nodes 144a to network device 102. Plurality of proxy nodes 144a includes proxy node 140a, proxy node 140b, and proxy node 140c (the set of proxy nodes preferred for data traffic type 206a) and excludes proxy node 140d.

Operation 316 includes receiving, by network device 102, the identification of proxy node 140a. In some examples, operation 316 includes receiving, by network device 102, the identification of plurality of proxy nodes 144a. Operation 318 (also shown as selection 212 in FIG. 2) includes selecting, by network device 102, a proxy node (e.g., proxy node 140a) from among the identified plurality of proxy nodes 144a. Operation 320 includes connecting, by network device 102, to the selected proxy node (e.g., proxy node 140a) using a session request 214a.

If network device 102 is unable to successfully connect to the selected proxy node, as determined in decision operation 322, network device 102 performs a failover in operation 324 (also shown as fail-over 218 in FIG. 2), using another proxy node in the received plurality of proxy nodes. Flowchart 300 returns to operation 318 to select the fail-over proxy node. In the illustrated example, proxy node 140b is selected as the fail-over alternative to proxy node 140a. If network device 102 is unable to successfully connect to proxy node 140b, with a session request 214b, network device 102 transmits data traffic to IMS-AGW 150 through proxy node 140b, using data traffic 216ba from network device 102, which is forwarded by proxy node 140b to IMS-AGW 150 as data traffic 216bb.

If, however, network device 102 is able to successfully connect to proxy node 140a, as determined in decision operation 322, network device 102 transmits data traffic 216aa, to (connected) proxy node 140a, in operation 326. Data traffic 216aa is forwarded by proxy node 140a as data traffic 216ab. Operation 326 also includes receiving, at proxy node 140a (or failover proxy node 140b), data traffic from network device 102. In some examples, the data traffic comprises IMS traffic.

The proxy node registration for network device 102 expires at box 328 (also shown as expiration 240 in FIG. 2), so flowchart 300 returns to operation 304. If network device 102 now needs to transmit data traffic type 222a (a different traffic type) a different set of proxy nodes will be used for the network slicing. Or, network device 102 may have moved and a different set of proxy nodes will be used for WPS or E911, based on the different geographic location.

As flowchart 300 passes through operations 304-326 again, proxy node 140d will be used in place of proxy node 140a. Also, a plurality of proxy nodes 144b, which includes proxy node 140d, proxy node 140e, and proxy node 140f (the set of proxy nodes preferred for data traffic type 222a) and excludes proxy node 140a, will be used in place of plurality of proxy nodes 144a.

Network device 102 determines the data traffic type for which it will be using a proxy node in operation 304 (also shown as decision 220 in FIG. 2, for this second pass through flowchart 300). This is the data traffic type that will be identified in proxy node discovery request 222 as data traffic type 222a. In operation 306, network device 102 starts periodic proxy node registration with the second (different) data traffic type. Operation 306 includes transmitting, by network device 102, to network node 120, the second message (proxy node discovery request 222) indicating a request for identification of a proxy node. In some examples, the indication of data traffic type 222a is within the second message indicating the request for identification of a proxy node.

Operation 308 (second pass) includes, receiving, by network node 120, from network device 102, the second message indicating the request for identification of a proxy node. Operation 310 (second pass) includes receiving, by network node 120, from network device 102, an indication of data traffic type 222a. In some examples, the indication of data traffic type 222a is within the second message indicating the request for identification of a proxy node. Operation 312 (second pass) includes, based on at least the indication of the second data traffic type, selecting, by network node 120, proxy node 140d over proxy node 140a to identify to network device 102 (e.g., based on at least selection criteria 132, and/or determining that proxy node 140d is preferred to handle data traffic type 222a). This is also shown as selection 224 in FIG. 2.

Operation 314 (second pass) includes transmitting an identification of proxy node 140d to network device 102 as list 226. This may include transmitting identification of plurality of proxy nodes 144b to network device 102, plurality of proxy nodes 144b excluding proxy node 140a. Operation 316 (second pass) includes receiving, by network device 102, the identification of proxy node 140d (or plurality of proxy nodes 144b).

Operation 318 (second pass, also shown as selection 228 in FIG. 2) includes selecting, by network device 102, a proxy node (e.g., proxy node 140d) from among the identified plurality of proxy nodes 144b. Operation 320 (second pass) includes connecting, by network device 102, to the selected proxy node (e.g., proxy node 140d) using a session request 230d. If, in this second pass through flowchart 300, decision operation 322 indicates success, network device 102 transmits data traffic 232da, to (connected) proxy node 140d, in operation 326. Data traffic 232da is forwarded by proxy node 140d as data traffic 232db. Operation 326 (second pass) also includes receiving, at proxy node 140d (or a failover proxy node), data traffic from network device 102. This second registration period expires at box 328, and flowchart returns again to back to operation 304.

Figure 4:
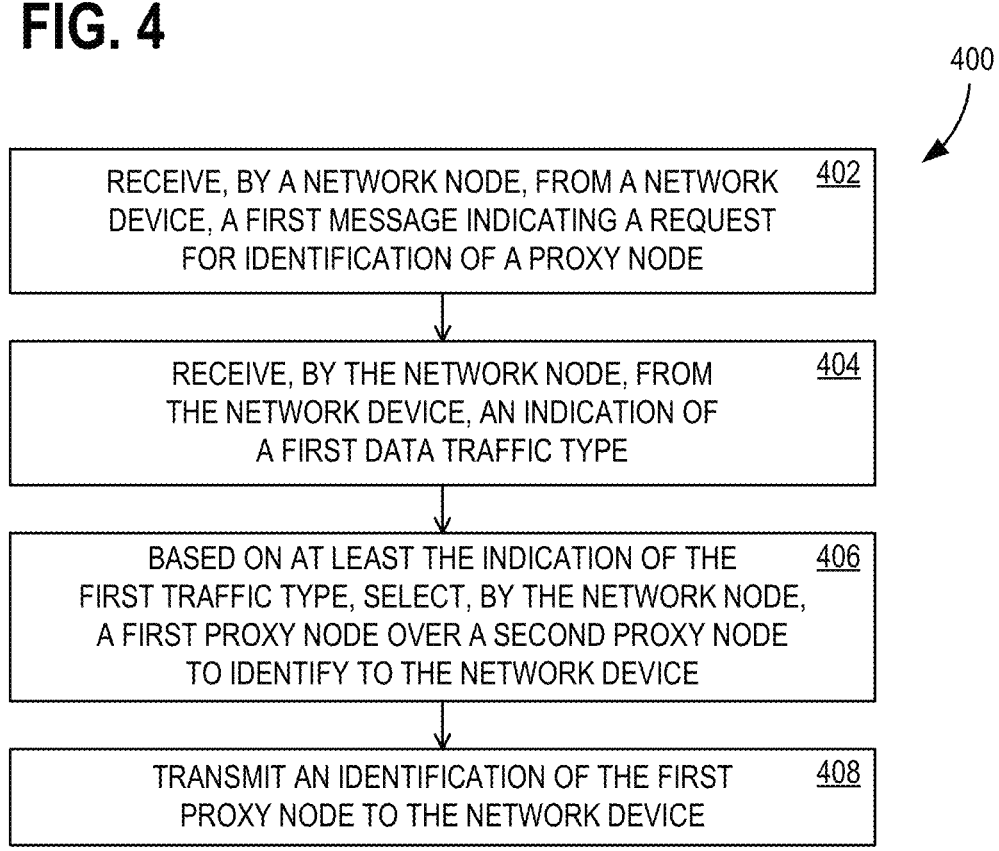
FIG. 4 illustrates another flowchart of exemplary operations associated with examples of the arrangement of FIG. 1.

FIG. 4 illustrates a flowchart 400 of exemplary operations associated with examples of arrangement 100. In some examples, at least a portion of flowchart 400 may each be performed using one or more computing devices 500 of FIG. 5. Flowchart 400 commences with operation 402, which includes receiving, by a network node, from a network device, a first message indicating a request for identification of a proxy node. Operation 404 includes receiving, by the network node, from the network device, an indication of a first data traffic type. Operation 406 includes, based on at least the indication of the first data traffic type, selecting, by the network node, a first proxy node over a second proxy node to identify to the network device. Operation 408 includes transmitting an identification of the first proxy node to the network device.

Figure 5:
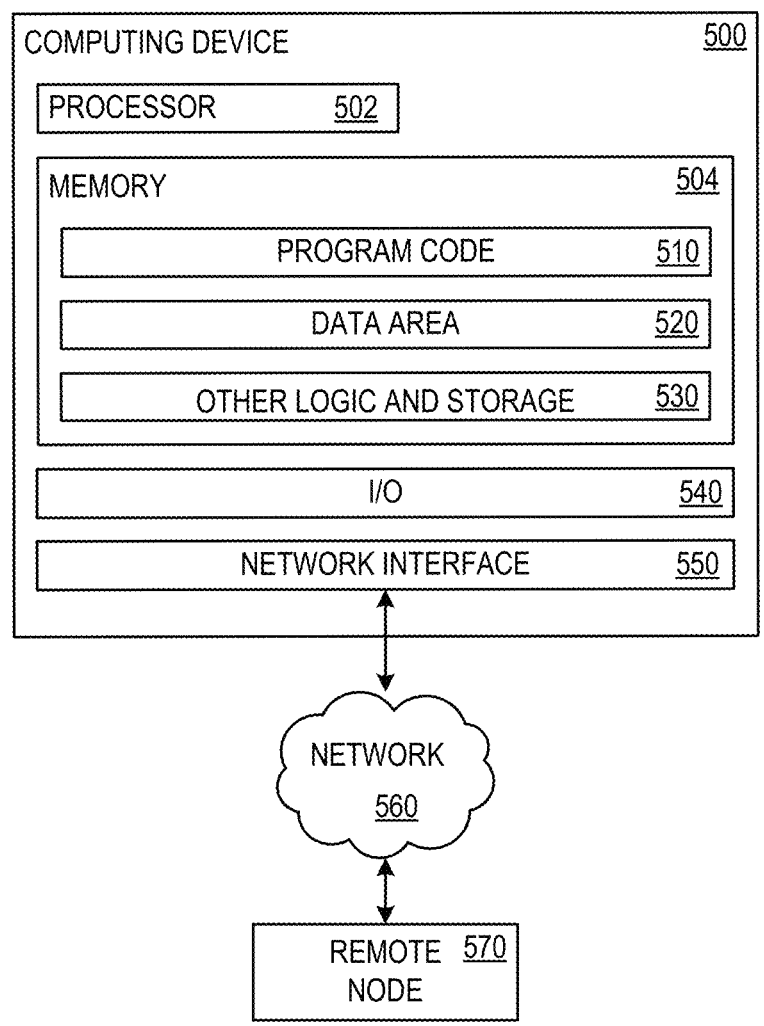
FIG. 5 illustrates a block diagram of a computing device suitable for implementing various aspects of the disclosure.

FIG. 5 illustrates a block diagram of computing device 500 that may be used as a component of arrangement 100, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500.

Additional Examples

An example method of providing wireless service comprises: receiving, by a network node, from a network device, a first message indicating a request for identification of a proxy node; receiving, by the network node, from the network device, an indication of a first data traffic type; based on at least the indication of the first data traffic type, selecting, by the network node, a first proxy node over a second proxy node to identify to the network device; and transmitting an identification of the first proxy node to the network device.

An example system for providing a wireless service comprises: a processor; and a computer-readable medium storing instructions that are operative upon execution by the processor to: receive, by a network node, from a network device, a first message indicating a request for identification of a proxy node; receive, by the network node, from the network device, an indication of a first data traffic type; based on at least the indication of the first data traffic type, select, by the network node, a first proxy node over a second proxy node to identify to the network device; and transmit an identification of the first proxy node to the network device.

One or more example computer storage devices has computer-executable instructions stored thereon, which, upon execution by a computer, cause the computer to perform operations comprising: receiving, by a network node, from a network device, a first message indicating a request for identification of a proxy node; receiving, by the network node, from the network device, an indication of a first data traffic type; based on at least the indication of the first data traffic type, selecting, by the network node, a first proxy node over a second proxy node to identify to the network device; and transmitting an identification of the first proxy node to the network device.

Alternatively, or in addition to the other examples described herein, examples include any combination of the following:

the first proxy node comprises a P-CSCF;
the second proxy node comprises a P-CSCF;
the network device comprises a UE or an IoT device;
the network node comprises at least one node selected from the list consisting of: a PGW, a UPF, an SMF, an SAEGW-C, an SAEGW-U, and a PDN Gateway;
the indication of the first data traffic type is within the first message indicating the request for identification of a proxy node;
receiving, by the network node, from the network device, a second message indicating a request for identification of a proxy node;
receiving, by the network node, from the network device, an indication of a second data traffic type;
based on at least the indication of the second data traffic type, selecting, by the network node, the second proxy node over the first proxy node to identify to the network device;
transmitting an identification of the second proxy node to the network device;
the first data traffic type comprises at least one data traffic type selected from the list consisting of: 5G cellular data, 4G cellular data, voice call, video call, WPS, E911, SMS, RCS, instant messaging, managed WiFi, in-vehicle wireless, IoT, M2M communication, IoT vertical, SIM-less, CS, roaming, gaming, and streaming video;
transmitting the identification of the first proxy node to the network device comprises transmitting identification of a plurality of proxy nodes to the network device, the plurality of proxy nodes excluding the second proxy node;
selecting the first proxy node comprises selecting the first proxy node based on at least selection criteria, the selection criteria comprising at least one factor selected from the list consisting of: a geographical location, latency, loading, and network slicing;
the indication of the second data traffic type is within the second message indicating the request for identification of a proxy node;
transmitting the identification of the second proxy node to the network device comprises transmitting identification of a plurality of proxy nodes to the network device, the plurality of proxy nodes excluding the first proxy node;
receiving, at the first proxy node, data traffic from the network device;
receiving, at the first proxy node, IMS traffic from the network device;
receiving, at the second proxy node, data traffic from the network device;

receiving, at the second proxy node, IMS traffic from the network device;
selecting the first proxy node comprises selecting the first proxy node based on at least determining that the first proxy node is preferred to handle the first data traffic type;
selecting the second proxy node comprises selecting the second proxy node based on at least determining that the second proxy node is preferred to handle the second data traffic type;
selecting the second proxy node comprises selecting the second proxy node based on at least the selection criteria;
receiving, by the network device, the identification of the first proxy node;
transmitting data traffic, by the network device, to the first proxy node;
receiving, by the network device, the identification of the second proxy node;
connecting, by the network device, to the first proxy node;
transmitting data traffic, by the network device, to the second proxy node;
receiving, by the network device, the identification of a plurality of proxy nodes;
performing a failover, by the network device, using a proxy node in the received plurality of proxy nodes;
pushing, by the first proxy node and the second proxy node status updates to the network node;
receiving, by a network node, the status updates for the first proxy node and the second proxy node;
pushing, by the first proxy node and the second proxy node status updates to an NRF; and
receiving, by a network node, the status updates for the first proxy node and the second proxy node from the NRF;

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing wireless service, the method comprising:

receiving, by a network node, a proxy-call session control function (P-CSCF) node discovery request message requesting identification of a P-CSCF node for a data traffic session of a network device, wherein a data traffic type indication, within the P-CSCF node discovery request message, that identifies a specific data traffic type from a list consisting of: fifth generation (5G) cellular data, fourth generation (4G) cellular data, voice call, video call, wireless priority service (WPS), enhanced 911 (E911), short message service (SMS), rich communication services (RCS), instant messaging, managed WiFi, in-vehicle wireless, internet of things (IoT), machine-to-machine (M2M) communication, IoT vertical, subscriber identity module (SIM)-less, circuit-switched (CS), roaming, gaming, and streaming video;
based on at least the data traffic type indication within the P-CSCF node discovery request message, selecting, by the network node, a list of P-CSCF nodes to be sent in response to the P-CSCF node discovery request message, wherein one or more P-CSCF nodes in the list of P-CSCF nodes are selected based on the data traffic type indication within the P-CSCF node discovery request message and network slicings associated with the one or more P-CSCF nodes; and
transmitting, by the network node, the list of P-CSCF nodes to the network device.

2. The method of claim 1, wherein the network node comprises at least one node selected from a list consisting of: a packet gateway (PGW), a user plane function (UPF), a session management function (SMF), a system architecture evolution gateway (SAEGW) control plane (SAEGW-C), an SAEGW-user plane (SAEGW-U), and a Packet Data Network Gateway (PDN Gateway).

3. The method of claim 1, wherein the network device is a user equipment (UE).

4. The method of claim 1, wherein the network device is an internet of things (IoT) device.

5. The method of claim 1, wherein one or more P-CSCF nodes in the list of P-CSCF nodes are selected based on the data traffic type indication within the P-CSCF node discovery request message and geographical locations of the one or more P-CSCF nodes.

6. The method of claim 1, wherein one or more P-CSCF nodes in the list of P-CSCF nodes are selected based on the data traffic type indication within the P-CSCF node discovery request message and latencies associated with the one or more P-CSCF nodes.

7. The method of claim 1, wherein one or more P-CSCF nodes in the list of P-CSCF nodes is selected based on the data traffic type indication within the P-CSCF node discovery request message and loadings associated with the one or more P-CSCF nodes.

8. The method of claim 1, wherein the list of P-CSCF nodes consists of one or more P-CSCF nodes that support the specific data traffic type indicated by the data traffic type indication within the P-CSCF node discovery request message.

9. A network node comprising:
a processor; and
a computer-readable medium storing instructions that are operative upon execution by the processor to:
receive a proxy-call session control function (P-CSCF) node discovery request message requesting identification of a P-CSCF node for a data traffic session of a network device, wherein a data traffic type indication, within the P-CSCF node discovery request message, identifies a specific data traffic type from a list consisting of: fifth generation (5G) cellular data, fourth generation (4G) cellular data, voice call, video call, wireless priority service (WPS), enhanced 911 (E911), short message service (SMS), rich communication services (RCS), instant messaging, managed WiFi, in-vehicle wireless, internet of things (IoT), machine-to-machine (M2M) communication, IoT vertical, subscriber identity module (SIM)-less, circuit-switched (CS), roaming, gaming, and streaming video;

based on at least the data traffic type indication within the P-CSCF node discovery request message, select a list of P-CSCF nodes to be sent in response to the P-CSCF node discovery request message, wherein one or more P-CSCF nodes in the list of P-CSCF nodes are selected based on the data traffic type indication within the P-CSCF node discovery request message and network slicings associated with the one or more P-CSCF nodes; and transmit the list of P-CSCF nodes to the network device.

10. The network node of claim 9, wherein the network node comprises at least one node selected from a list consisting of: a packet gateway (PGW), a user plane function (UPF), a session management function (SMF), a system architecture evolution gateway (SAEGW) control plane (SAEGW-C), an SAEGW-user plane (SAEGW-U), and a Packet Data Network Gateway (PDN Gateway).

11. The network node of claim 9, wherein the network device is a user equipment (UE).

12. The network node of claim 9, wherein the network device is an internet of things (IoT) device.

13. The network node of claim 9, wherein one or more P-CSCF nodes in the list of P-CSCF nodes are selected based on the data traffic type indication within the P-CSCF node discovery request message and geographical locations of the one or more P-CSCF nodes.

14. The network node of claim 9, wherein one or more P-CSCF nodes in the list of P-CSCF nodes are selected based on the data traffic type indication within the P-CSCF node discovery request message and latencies associated with the one or more P-CSCF nodes.

15. The network node of claim 9, wherein one or more P-CSCF nodes in the list of P-CSCF nodes is selected based on the data traffic type indication within the P-CSCF node discovery request message and loadings associated with the one or more P-CSCF nodes.

16. One or more computer storage devices having computer-executable instructions stored thereon, which, upon execution by a computer, cause the computer to perform operations comprising:

receiving a proxy-call session control function (P-CSCF) node discovery request message requesting identification of a P-CSCF node for a data traffic session of a network device, wherein a data traffic type indication, within the P-CSCF node discovery request message, identifies a specific data traffic type from a list consisting of: fifth generation (5G) cellular data, fourth generation (4G) cellular data, voice call, video call, wireless priority service (WPS), enhanced 911 (E911), short message service (SMS), rich communication services (RCS), instant messaging, managed WiFi, in-vehicle wireless, internet of things (IoT), machine-to-machine (M2M) communication, IoT vertical, subscriber identity module (SIM)-less, circuit-switched (CS), roaming, gaming, and streaming video;

based on at least the data traffic type indication within the P-CSCF node discovery request message, selecting a list of P-CSCF nodes to be sent in response to the P-CSCF node discovery request message, wherein one or more P-CSCF nodes in the list of P-CSCF nodes are selected based on the data traffic type indication within the P-CSCF node discovery request message and network slicings associated with the one or more P-CSCF nodes; and transmitting the list of P-CSCF nodes to the network device.

\* \* \* \* \*